United States Patent
Feng (10) Patent No.: US 10,846,383 B2
(45) Date of Patent: Nov. 24, 2020

(54) APPLET-BASED ACCOUNT SECURITY PROTECTION METHOD AND SYSTEM

(71) Applicant: ADVANCED NEW TECHNOLOGIES CO., LTD., Grand Cayman (KY)

(72) Inventor: Lisha Feng, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/860,065

(22) Filed: Apr. 28, 2020

(65) Prior Publication Data

US 2020/0257780 A1    Aug. 13, 2020

Related U.S. Application Data

(63) Continuation of application No. PCT/CN2020/071595, filed on Jan. 11, 2020.

(30) Foreign Application Priority Data

Jul. 1, 2019    (CN) .......................... 2019 1 0584384

(51) Int. Cl.
    *G06F 21/00*    (2013.01)
    *G06F 21/31*    (2013.01)
    *G06F 21/60*    (2013.01)
(52) U.S. Cl.
    CPC ............ *G06F 21/31* (2013.01); *G06F 21/602* (2013.01)

(58) Field of Classification Search
    CPC ............................... G06F 21/31; G06F 21/602
    See application file for complete search history.

(56) References Cited

U.S. PATENT DOCUMENTS 7,149,698 B2 * 12/2006 Guheen ................. G06Q 50/01
                                                            705/319
7,308,431 B2    12/2007 Asokan et al.
(Continued)

FOREIGN PATENT DOCUMENTS

CN    103532927 A    1/2014
CN    107292150 A    10/2017
(Continued)

OTHER PUBLICATIONS

First Search dated May 8, 2020, issued in related Chinese Application No. 201910584384.9 (2 pages).
(Continued)

*Primary Examiner* — Don G Zhao (57) ABSTRACT

An applet-based account security protection method and system are disclosed. The method may comprise: receiving, from an applet, a processing request for a target service related to a target account, wherein the target account is opened by a user at a service provider corresponding to the applet, and the applet runs on a client of a third-party application; and triggering a first security system and a second security system to jointly perform risk prevention and control on a target service related to the target account. The first security system is a security system of the service provider, and the second security system is a security system corresponding to the third-party application.

20 Claims, 5 Drawing Sheets

(56) References Cited

U.S. PATENT DOCUMENTS

| | | | |
|---|---|---|---|
| 7,844,546 B2* | 11/2010 | Fleishman | G06Q 20/40 705/39 |
| 8,239,953 B1* | 8/2012 | Satish | H04L 63/105 726/1 |
| 8,515,862 B2 | 8/2013 | Zhang et al. | |
| 8,533,803 B2 | 9/2013 | Cha et al. | |
| 8,645,227 B2* | 2/2014 | Owen | G06Q 20/4014 705/26.44 |
| 8,769,651 B2 | 7/2014 | Grajek et al. | |
| 8,881,977 B1 | 11/2014 | Paczkowski et al. | |
| 9,161,708 B2 | 10/2015 | Elliott et al. | |
| 9,710,752 B2 | 7/2017 | Salajegheh et al. | |
| 9,734,169 B2 | 8/2017 | Redlich et al. | |
| 9,923,718 B2 | 3/2018 | Bailey et al. | |
| 9,934,506 B2 | 4/2018 | MacKinnon | |
| 9,947,006 B2 | 4/2018 | Mestre et al. | |
| 10,055,578 B1* | 8/2018 | Marquardt | H04L 63/14 |
| 10,192,214 B2* | 1/2019 | Jiang | G06Q 20/341 |
| 10,243,945 B1* | 3/2019 | Kruse | H04L 63/0815 |
| 10,262,481 B2 | 4/2019 | Saravanan | |
| 10,460,382 B2 | 10/2019 | Dominguez | |
| 10,469,521 B1* | 11/2019 | Segal | H04L 63/1433 |
| 10,587,609 B2 | 3/2020 | Ebrahimi et al. | |
| 2004/0128558 A1* | 7/2004 | Barrett | G06F 21/31 726/8 |
| 2005/0010813 A1* | 1/2005 | Puricelli | H04L 63/123 726/4 |
| 2007/0067297 A1* | 3/2007 | Kublickis | G06Q 20/29 |
| 2008/0235043 A1* | 9/2008 | Goulandris | G06F 21/33 705/1.1 |
| 2014/0181925 A1* | 6/2014 | Smith | H04L 63/08 726/6 |
| 2014/0209672 A1 | 7/2014 | Mestre et al. | |
| 2015/0237502 A1 | 8/2015 | Schmidt et al. | |
| 2015/0294281 A1* | 10/2015 | Rose | G06Q 20/108 705/42 |
| 2017/0004573 A1* | 1/2017 | Hussain | G06Q 40/025 |
| 2017/0339138 A1* | 11/2017 | Lewison | H04L 9/3239 |
| 2018/0033089 A1* | 2/2018 | Goldman | G06Q 40/10 |
| 2019/0036864 A1* | 1/2019 | Reuss | H04L 63/102 |
| 2019/0138727 A1* | 5/2019 | Dontov | H04L 63/1408 |
| 2019/0158468 A1* | 5/2019 | Duong | H04L 9/0844 |
| 2019/0220863 A1* | 7/2019 | Novick | G06Q 20/10 |
| 2019/0333138 A1* | 10/2019 | Kirsh | G06Q 40/00 |
| 2019/0387402 A1 | 12/2019 | Li et al. | |

FOREIGN PATENT DOCUMENTS

| | | |
|---|---|---|
| CN | 109165514 A | 1/2019 |
| CN | 109471782 A | 3/2019 |
| CN | 109492401 A | 3/2019 |
| CN | 109635528 A | 4/2019 |

OTHER PUBLICATIONS

First Office Action dated May 15, 2020, issued in related Chinese Application No. 201910584384.9, with English machine translation (23 pages).

Second Office Action dated Jun. 19, 2020, issued in related Chinese Application No. 201910584384.9, with English machine translation (29 pages).

ZiZhen Cheng, "The Design and Implementation of Online Shopping System Based on WeChat Mini Program", Master Degree Thesis of Capital University of Economics and Business, Beijing, China, with English language abstract (74 pages).

Supplementary Search for Chinese Application No. 201910584384.9 dated Jul. 16, 2020.

* cited by examiner

APPLET-BASED ACCOUNT SECURITY PROTECTION METHOD AND SYSTEM

CROSS-REFERENCE TO RELATED APPLICATION

This application is a continuation application of International Patent Application No. PCT/CN2020/071595, filed on Jan. 11, 2020, which is based on and claims priority of the Chinese Patent Application No. 201910584384.9, filed on Jul. 1, 2019. The above-referenced applications are incorporated herein by reference in their entirety.

TECHNICAL FIELD

The present application relates to the field of computer technologies, and more specifically, to an applet-based account security protection method and system.

BACKGROUND

An applet is an application running on a client of a third-party application (an application, or APP) without having to be specifically downloaded or installed. Due to its ease in accessibility and transferability, an applet can provide better user experience for mobile terminal users.

Currently, an applet mainly relies on the security system (such as a risk control system and an identity verification system) of the third-party application under which the applet runs to provide protection to a target account opened by a service provider corresponding to the applet. However, some special applets may also have their own security systems in addition to the security systems of the third-party applications to which the applets are associated with. For example, in addition to an identity verification system of a third-party application under which a bank applet runs, the bank applet may further have its own account and password-based identity verification system. In this case, security monitoring and control performed by the security system of the third-party application obviously is not sufficient to meet the security requirement of a target account.

SUMMARY

The present application provides an applet-based account security protection method and system to protect the security of a target account.

To solve the aforementioned technical problems, the embodiments of the present application are implemented as follows.

According to a first aspect, an applet-based account security protection method is provided. The method may include: receiving, from an applet, a processing request for a target service related to a target account, wherein the target account is opened by a user at a service provider corresponding to the applet, and the applet runs on a client of a third-party application; and triggering a first security system and a second security system to jointly perform risk prevention and control on the target service related to the target account. The first security system may be a security system of the service provider, and the second security system may be a security system corresponding to the third-party application.

The first security system may include a first identity verification system, and the second security system may include a second identity verification system.

The triggering a first security system and a second security system to jointly perform risk prevention and control on the target service related to the target account may further include: triggering the first identity verification system and the second identity verification system to jointly perform identity verification on the user initiating the target service to obtain a joint identity verification result; and feeding back the joint identity verification result to the applet for the applet to determine, according to the joint identity verification result, whether to proceed with the target service.

According to a second aspect, an applet-based account security protection system is provided. The system may include: a server end, a first security system, and a second security system. The system may be configured to perform operations, comprising: receiving, by the server end, from an applet, a processing request for a target service related to a target account, wherein the target account is opened by a user at a service provider corresponding to the applet, and the applet runs on a client of a third-party application; and triggering, by the server end, the first security system and the second security system to jointly perform risk prevention and control on the target service related to the target account. The first security system may be a security system of the service provider, and the second security system may be a security system corresponding to the third-party application.

The first security system may include a first identity verification system, and the second security system may include a second identity verification system.

The triggering, by the server end, the first security system and the second security system to jointly perform risk prevention and control on the target service related to the target account may further include: triggering the first identity verification system and the second identity verification system to jointly perform identity verification on the user initiating the target service to obtain a joint identity verification result; and feeding back the joint identity verification result to the applet for the applet to determine, according to the joint identity verification result, whether to proceed with the target service.

According to a third aspect, an applet-based account security protection method is provided. The method may include: initiating, by an applet, to a server end of the applet a processing request for a target service related to a target account. The target account may be opened by a user at a service provider corresponding to the applet, and the applet may run on a client of a third-party application.

The method may further include triggering, by the server end, a first security system and a second security system to jointly perform risk prevention and control on the target service related to the target account. The first security system may be a security system of the service provider, and the second security system may be a security system corresponding to the third-party application.

According to a fourth aspect, an applet-based bank account security protection method is provided. The method may include: initiating, by an applet, to a bank server end a processing request for a target service related to a target bank account. The applet may run on a client of a third-party application.

The method may further include triggering, by the bank server end, a first security system and a second security system to jointly perform risk prevention and control on the target service related to the target bank account. The first security system may be a security system of the bank, and the second security system may be a security system corresponding to the third-party application.

According to a fifth aspect, an applet-based account security protection system is provided. The system may include an applet, a server end of the applet, a first security system, and a second security system.

The applet may be configured to initiate a processing request for a target service related to a target account to a server end of the applet. The target account may be opened by a user at a service provider corresponding to the applet, and the applet may run on a client of a third-party application.

The server end may be configured to trigger the first security system and the second security system to jointly perform risk prevention and control on a target service related to the target account. The first security system may be a security system of the service provider, and the second security system may be a security system corresponding to the third-party application.

According to a sixth aspect, an applet-based bank account security protection system is provided. The system may include an applet, a bank server end, a first security system, and a second security system.

The applet may be configured to initiate a processing request for a target service concerning a target bank account to the bank server end. The applet may run on a client of a third-party application.

The server end may be configured to trigger the first security system and the second security system to jointly perform risk prevention and control on the target service related to the target bank account. The first security system may be a security system of a bank, and the second security system may be a security system corresponding to the third-party application.

In view of the above technical solutions provided in the foregoing embodiments of the present application, the solutions provided in the embodiments of the present application have at least one of the following technical effects. Rather than merely using the security system of the third-party application, both the security system of the service provider corresponding to the applet and the security system of the third-party application under which the applet runs are used to jointly perform risk prevention and control on the target service related to the target account initiated by the applet, thus the security of the target account can be more reliably protected. Moreover, when the applet runs under the third-party application, not only the services of the service provider corresponding to the applet can be expanded by using the third-party application, powerful product capabilities of the third-party application can also be resorted to by the service provider corresponding to the applet to complete the know-your-customer (KYC) process.

BRIEF DESCRIPTION OF THE DRAWINGS

The accompanying drawings described herein are intended to facilitate further understanding of the present application, and constitute a part of the present application. The illustrative embodiments of the present application and the descriptions thereof are used to explain the present application, and are not intended to constitute an improper limitation on the present application.

DETAIL DESCRIPTION OF THE EMBODIMENTS

Hereinafter, the embodiments of the present invention will be further described in detail below in conjunction with accompanying drawings and embodiments to make the purpose, technical solutions, and advantages of the present utility invention clearer and more apparent. Apparently, the described embodiments are merely some but not all of the embodiments. All other embodiments obtainable by persons of ordinary skill in the art based on the embodiments of the present application without creative efforts shall fall within the protection scope of the present application.

Embodiments of the specification provide an applet-based account security protection method and system, and a bank applet-based bank account security protection method and system to for protecting the security of a target account when an operation is performed on the target account by using an applet. A system architecture in the embodiments of this description with reference to FIG. 1 will be described first to provide a clear understanding of application scenarios of various technical solutions provided in the embodiments of this description.

Figure 1:
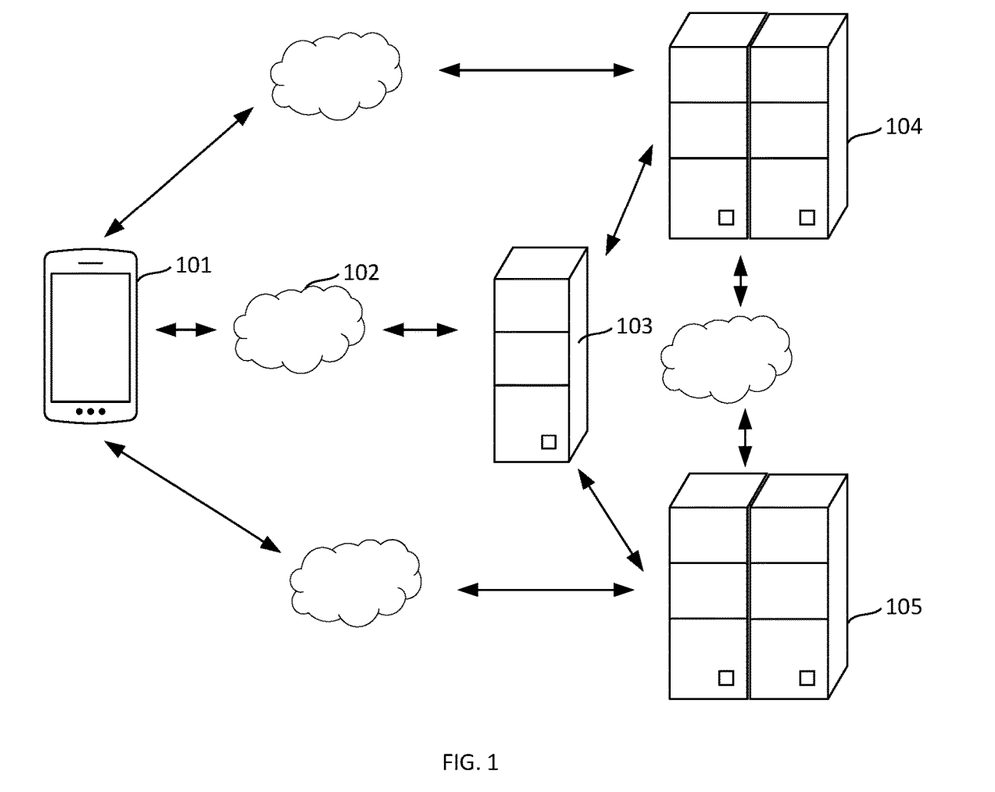
FIG. 1 shows a schematic diagram of a system architecture according to an embodiment of this description.

As shown in FIG. 1, a system architecture in the embodiments of this description may include: a user terminal 101, a server end 103 of an applet, a first security system 104, and a second security system 105.

A third-party application may be installed on the user terminal 101. The third-party application may include the applet. The third-party application may be a super APP. The so-called super APP may refer to an essential APP with a large number of users. The user terminal 101 may be connected to the server end 103 of the applet through a network 102 to perform data communication or exchange. The user terminal 101 may be a smart device that can be connected to a network, such as a personal computer (PC), a notebook computer, a tablet computer, a smart phone, an electronic reader, a web television, or a wearable device.

The first security system 104 may be a security system of a service provider corresponding to the applet. For example, when the applet is an applet of a bank, the service provider corresponding to the applet may be the bank. The first security system 104 may include a first risk control system and a first identity verification system; and the first security system 104 may be deployed in one or more servers.

The second security system 105 may be a security system corresponding to the third-party application. For example, when the third-party application is a third-party payment APP, the second security system 105 may be a security system of the third-party payment APP. The second security system 105 may include a second risk control system and a second identity verification system, and may be deployed in one or more servers.

Figure 2:
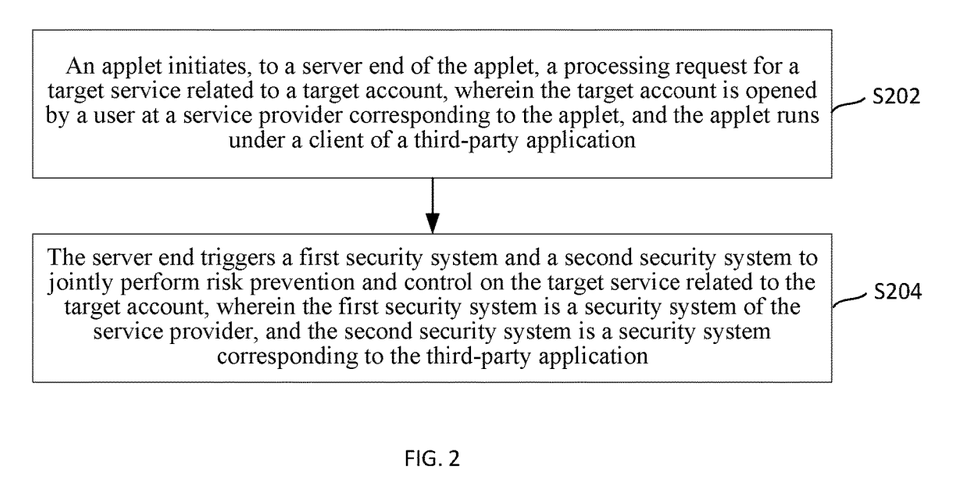
FIG. 2 shows a schematic flow chart of an applet-based account security protection method according to an embodiment of this description.

On the basis of the system architecture shown in FIG. 1, the embodiments of this description provide an applet-based account security protection method as shown in FIG. 2. The method may include the following steps S202 and S204.

In step 202, an applet may initiate to a server end of the applet, a processing request for a target service related to a target account. The target account may be opened by a user at a service provider corresponding to the applet, and the applet may run on a client of a third-party application.

For example, as shown in FIG. 1, a processing request for a target service related to a target account may be initiated, by the applet in the third-party application installed on the user terminal 101, to the server end 103 of the applet.

The applet may be any applet, for example, a bank applet that correspondingly has its own security system (the aforementioned first security system). When the applet is a bank applet, accordingly, the service provider corresponding to the applet may be a bank. The target account may be an account opened at the bank by the user, and the target service may be a login service, a payment service, a transfer service, or the like. For the sake of concise description, a bank applet is used as an example for describing the applet in the embodiments of this description.

In step 204, the server end may trigger a first security system and a second security system to jointly perform risk prevention and control on a target service related to the target account. The first security system may be a security system of the service provider, and the second security system may be a security system corresponding to the third-party application.

For example, as shown in FIG. 1, the first security system 104 and the second security system 105 may be triggered by the server end 103 to jointly perform risk prevention and control on the target service related to the target account.

Several examples are used in below to describe in detail the process of using the first security system and the second security system to jointly perform risk prevention and control on the target service related to the target account.

First Example

Figure 3:
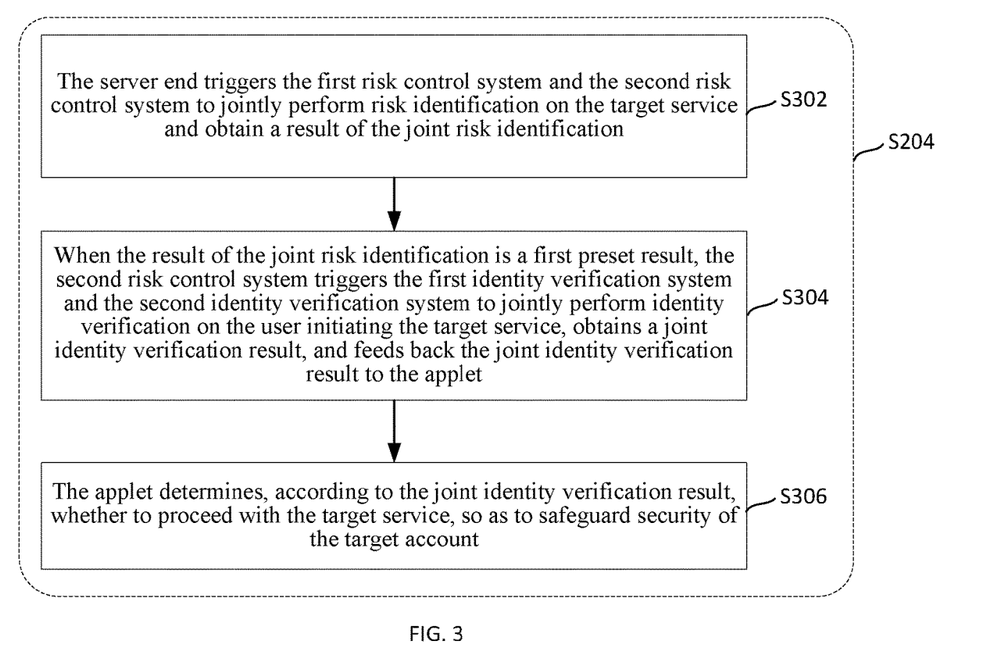
FIG. 3 shows a first schematic diagram of a detailed process of step 204 in the embodiment shown in FIG. 2.

The first security system may include a first risk control system and a first identity verification system, and the second security system may include a second risk control system and a second identity verification system. As shown in FIG. 3, step 204 may include the following sub-steps.

In sub-step S302, the server end may trigger the first risk control system and the second risk control system to jointly perform risk identification on the target service, and obtain a result of the joint risk identification.

For example, sub-step S302 may include the following steps.

In step 1, the server end may send a first risk identification request to the first risk control system. The first risk identification request may include information related to the target service (can also be called essential element information).

For example, a first risk identification request may be sent to a bank risk control system (the first risk control system) by a bank server end. Here, the essential element information included in the first risk identification request may include, without being limited to, device information such as an international mobile equipment identity (IMEI) and/or an MAC address of a user terminal, network environment information such as an IP address or a location-based service (lbs) of the user terminal, and information of the target service, for example, service information such as payee/payer account information and an amount when the target service is a transfer service.

In step 2, the first risk control system may perform risk identification on the target service based on the essential element information, obtain a first risk identification result, and send a second risk identification request to the second risk control system. The second risk identification request may include the essential element information and the first risk identification result.

For example, when the first risk control system is a bank risk control system and the target service is a transfer service, the first risk control system may determine indicators such as a service frequency and an accumulated transfer amount of the target account based on the essential element information, and determine a relationship between values of these indicators and a preset threshold to determine whether the target service related to the target account is compromised, thereby obtaining the first risk identification result. The first risk identification result may be a specific risk level, or a binary value indicating either with or without risk.

In step 3, the second risk control system may perform risk identification on the target service based on the essential element information, to obtain a second risk identification result, and combine the first risk identification result and the second risk identification result to obtain the result of the joint risk identification.

For example, the second risk control system may obtain a preset risk control model or a risk control modeled obtained after learning (such as big data analysis or user behavior analysis), extract an input parameter of the risk control model from the essential element information, and input the input parameter into the risk control model to obtain the second risk identification result.

Alternatively, the second risk control system may determine and obtain the second risk identification result on the basis of a preset risk determining rule. For example, the second risk identification result may be obtained by comparing whether a login place of a user is consistent with a place at which the transfer service takes place. For example, the user's login place is place A, but a transfer operation occurs at a place B. Since changing the user's current location from A to B within a short time is almost impossible, it can be determined that the target service is compromised, which is a highly risky transaction.

Here, the first risk identification result may be a specific risk level, or may be a binary value indicating with or without risk, or may be abnormal user behavior, highly risky service, or the like.

It should be noted that there may be multiple manners for showing the first risk identification result and the second risk identification result, which shall not be limited to the several manners listed above.

The result of the joint risk identification may be obtained by combining the first risk identification result and the second risk identification result. There may also be multiple manners for showing the result of the joint risk identification. For example, the result of the joint risk identification may be in any of the following forms:
1. Has risk, and need check;
2. Has risk, and don't need check;
3. No risk, and allowed; and
4. Has risk, and not allowed.

In sub-step 304, when the result of the joint risk identification is a first preset result, the second risk control system may trigger the first identity verification system and the second identity verification system to jointly perform identity verification on the user initiating the target service to obtain a joint identity verification result, and feed back the joint identity verification result to the applet.

Continuously using the example in sub-step 302, when the result of the joint risk identification is "Has risk, and need check" (i.e., the result of the joint risk identification is "Has risk, and need check"), the second risk control system may trigger the first identity verification system and the second identity verification system to jointly perform identity verification on the user initiating the target service to obtain the joint identity verification result, and feed back the joint identity verification result to the applet.

For example, the step of triggering, by the second risk control system, the first identity verification system and the second identity verification system to jointly perform identity verification on the user initiating the target service to obtain a joint identity verification result, and feeding back the joint identity verification result to the applet may include the following steps.

In step 1, the second risk control system may send to the second identity verification system an identity verification request. That is, the second risk control system may initialize identity verification to produce an identity verification context. The identity verification request may include an identity verification type.

In step 2, the second identity verification system may determine the identity verification type based on the identity verification request.

The identity verification type may include, without being limited to, at least one of password check, face recognition, and SMS check.

In step 3, when the identity verification type includes a first preset type, the first identity verification system may perform identity verification on the user to obtain a first identity verification result, and feed back the first identity verification result to the second identity verification system.

As one possible implementation manner, the first preset type may be password check. Accordingly, when the identity verification type includes the first preset type, the step that the first identity verification system performs identity verification on the user to obtain a first identity verification result may include: when the identity verification type includes password check, receiving, by a client of the third-party application, a password entered by the user, encrypting the password to obtain an encrypted password, and sending the encrypted password to the first identity verification system; and determining, by the first identity verification system, whether the encrypted password matches a preset original password, to obtain the first identity verification result. It should be appreciated that if the encrypted password matches the preset original password, the first identity verification result is that the verification succeeds. Otherwise, the first identity verification result is that the verification fails.

In one example, when the identity verification type includes password check, the password entered by the user may be received by using a rendered password input box of the client of the third-party application. The password may be encrypted by using a public key provided by the service provider (e.g., a bank) corresponding to the applet, to obtain the encrypted password. The encrypted password may be sent to the first identity verification system, and the first identity verification system may decrypt the encrypted password by using a private key corresponding to the public key to obtain a decrypted password, and determine whether the decrypted password is consistent with the preset original password, thereby obtaining the first identity verification result. It should be appreciated that if the decrypted password is consistent with the preset original password, the first identity verification result is that the verification succeeds. Otherwise, the first identity verification result is that the verification fails.

In step 4, when the identity verification type further includes a second preset type, the second identity verification system may perform identity verification on the user to obtain a second identity verification result, combine the first identity verification result and the second identity verification result as the joint identity verification result, and feed back the joint identity verification result to the applet.

As one possible implementation manner, the second preset type may be face recognition. When the identity verification type further includes the second preset type, the step that the second identity verification system performs identity verification on the user to obtain a second identity verification result may include: when the identity verification type further includes face recognition, performing, by the second identity verification system, face recognition on the user to obtain the second identity verification result.

In one example, the second identity verification system may call a face identity verification server end of the third-party application to perform face recognition on the user initiating the target service and obtain the second identity verification result. Similarly, the second identity verification result may be the verification succeeds or fails.

In sub-step 306, the applet may determine, according to the joint identity verification result, whether to proceed with the target service, to protect the security of the target account.

For example, when both the first identity verification result and the second identity verification result are that the verification succeeds, the applet may determine to proceed with (or allow) the target service. When at least one of the first identity verification result and the second identity verification result is that the verification fails, the applet may determine to stop proceeding with the target service, thereby protect the security of the target account.

In the aforementioned first example, not only the first risk control system and the second risk control system are used to perform joint prevention and control on risk identification of the target service related to the target account, the first identity verification system and the second identity verification system may further be used to perform joint prevention and control on identity verification of the user initiating the target service. Therefore, the security of the target account can be more reliably protected.

Second Example

Figure 4:
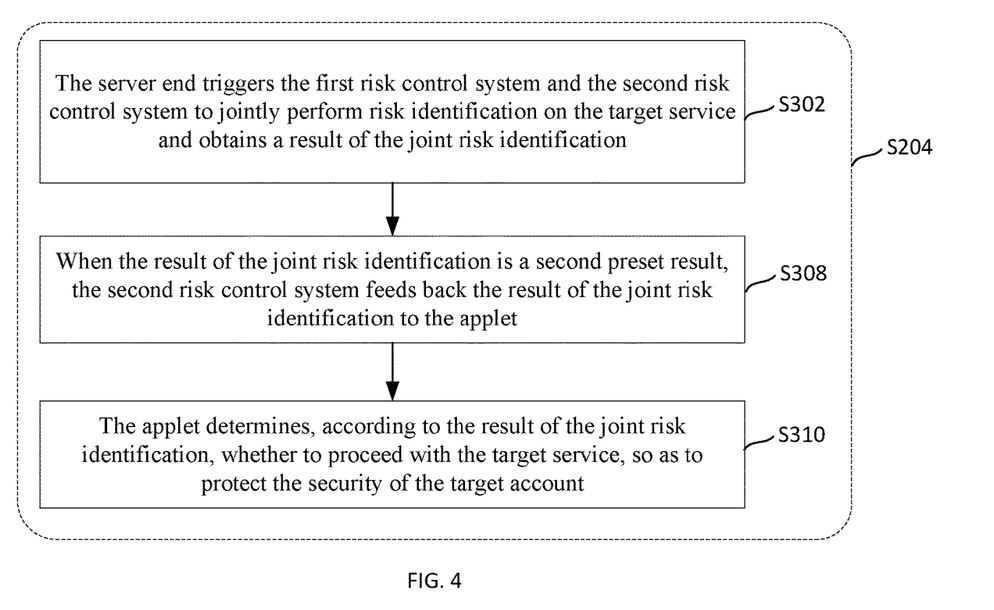
FIG. 4 shows a second schematic diagram of a detailed process of step 204 in the embodiment shown in FIG. 2.

The first security system may include a first risk control system and a first identity verification system, and the second security system may include a second risk control system and a second identity verification system. As shown in FIG. 4, step 204 may include the following sub-steps.

In sub-step 302, the server end may trigger the first risk control system and the second risk control system to jointly perform risk identification on the target service to obtain a result of the joint risk identification.

For example, sub-step 302 may include the following steps.

In step 1, the server end may send a first risk identification request to the first risk control system. The first risk identification request may include information related to the target service.

In step 2, the first risk control system may perform risk identification on the target service based on the essential element information, obtain a first risk identification result, and send a second risk identification request to the second risk control system. The second risk identification request may include the essential element information and the first risk identification result.

In step 3, the second risk control system may perform risk identification on the target service based on the essential element information to obtain a second risk identification result, and combine the first risk identification result and the second risk identification result to obtain the result of the joint risk identification.

The way to show the first risk identification result, the second risk identification result, and the result of the joint risk identification may be the same as those described in the first example above, and will not be elaborated herein.

In sub-step 308, when the result of the joint risk identification is a second preset result, the second risk control system may feed back the result of the joint risk identification to the applet.

For example, when the result of the joint risk identification is "No risk, and allowed", the second risk control system may feed back the result of the joint risk identification to the applet.

In sub-step 310, the applet may determine, according to the result of the joint risk identification, whether to proceed with the target service, to protect the security of the target account.

For example, when the result of the joint risk identification is "No risk", it may be determined to proceed with the target service, or when the result of the joint risk identification is "Has risk", the applet may determine to stop proceeding with the target service.

In the aforementioned second example, rather than merely using the second risk control system, the first risk control system and the second risk control system may perform joint prevention and control on risk identification of the target service related to the target account when identifying risks of the target service. Therefore, the security of the target account can be more reliably protected.

Third Example

Figure 5:
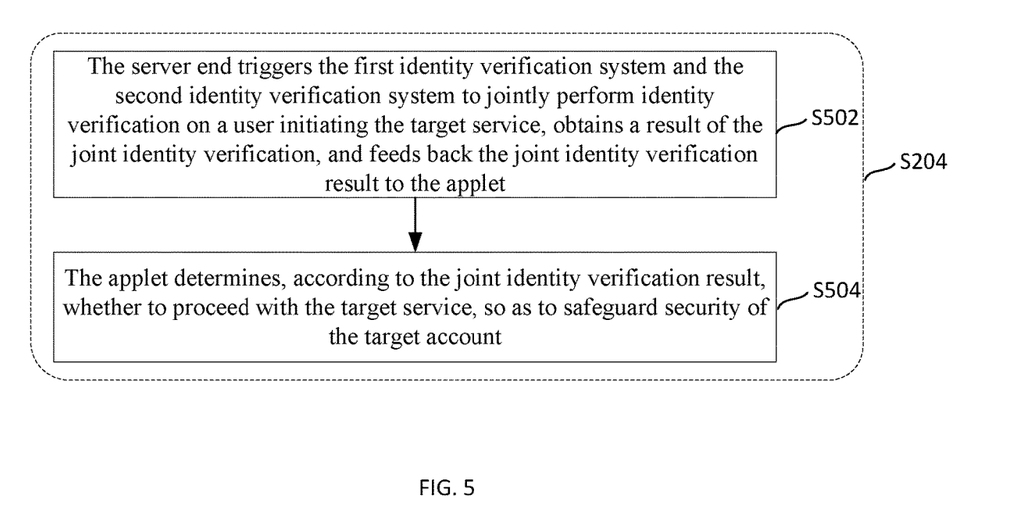
FIG. 5 shows a third schematic diagram of a detailed process of step 204 in the embodiment shown in FIG. 2.

The first security system may include a first identity verification system, and the second security system may include a second identity verification system. As shown in FIG. 5, step 204 may include the following sub-steps.

In sub-step 502, the server end may trigger the first identity verification system and the second identity verification system to jointly perform identity verification on the user initiating the target service to obtain a joint identity verification result, and feed back the joint identity verification result to the applet.

For example, the step that the server end triggers the first identity verification system and the second identity verification system to jointly perform identity verification on the user initiating the target service, obtains a joint identity verification result, and feeds back the joint identity verification result to the applet may include the following steps.

In step 1, the server end may send to the second identity verification system an identity verification request.

In step 2, the second identity verification system may determine an identity verification type based on the identity verification request.

In step 3, when the identity verification type includes a first preset type, the first identity verification system may perform identity verification on the user, obtain a first identity verification result, and feed back the first identity verification result to the second identity verification system.

In step 4, when the identity verification type further includes a second preset type, the second identity verification system may perform identity verification on the user to obtain a second identity verification result, combine the first identity verification result and the second identity verification result as the joint identity verification result, and feed back the joint identity verification result to the applet.

In sub-step 504, the applet may determine, according to the joint identity verification result, whether to proceed with the target service, to protect the security of the target account.

For example, when both the first identity verification result and the second identity verification result are that the verification succeeds, the applet may determine to proceed with the target service. When at least one of the first identity verification result and the second identity verification result is that the verification fails, the applet may determine to stop proceeding with the target service, thereby protecting the security of the target account.

In the aforementioned third example, the first identity verification system and the second identity verification system may perform joint prevention and control on identity verification of the user initiating the target service. Therefore, the security of the target account can be reliably protected.

In sub-step 306 of the aforementioned first example or in the sub-step 504 of the aforementioned third example, the step that the applet determines, according to the joint identity verification result, whether to proceed with the target service, to protect the security of the target account may include: initiating, by the applet, to the server end a check request concerning the joint identity verification result; triggering, by the server end, the first identity verification system and the second identity verification system to perform identity verification again on the user initiating the target service, obtaining a result of the secondary identity verification, and feeding back the result of the secondary identity verification to the applet; and when it is determined that the joint identity verification result is consistent with the result of the secondary identity verification, determining, by the applet according to the joint identity verification result, whether to proceed with the target service, to protect the security of the target account.

It should be appreciated that the first identity verification system and the second identity verification system are combined to perform identity verification again on the user initiating the target service, to check whether the joint identity verification result received by the applet has ever been tampered with. This ensures authenticity of the joint identity verification result, thereby providing more reliable protection on the security of the target account.

On this basis, the step of determining, by the applet according to the joint identity verification result, whether to proceed with the target service, to protect the security of the target account may include: when both the first identity verification result and the second identity verification result are that the verification succeeds, determining, by the applet, to proceed with the target service; and when at least one of the first identity verification result and the second identity verification result is that the verification fails, determining, by the applet, to stop proceeding with the target service, to protect the security of the target account.

According to the applet-based account security protection method provided in the embodiments of this description, rather than merely using the security system of the third-party application in performing risk prevention and control on the target service related to the target account and initiated by the applet, the security system of the service provider corresponding to the applet (the first security system) and the security system of the third-party application under which the applet is run (the second security system) are used to jointly perform risk prevention and control on the target service related to the target account and initiated by the applet. Therefore, the security of the target account can be more reliably protected.

Moreover, when the applet runs under the third-party application, not only the services of the service provider corresponding to the applet can be expanded by using the third-party application, powerful product capabilities of the third-party application can also be resorted to by the service provider corresponding to the applet to complete know-your-customer (KYC). In addition, the method provided in the embodiments of this description further expands the applicable scope of big data risk control capabilities and identity verification capabilities of the third-party application.

Figure 6:
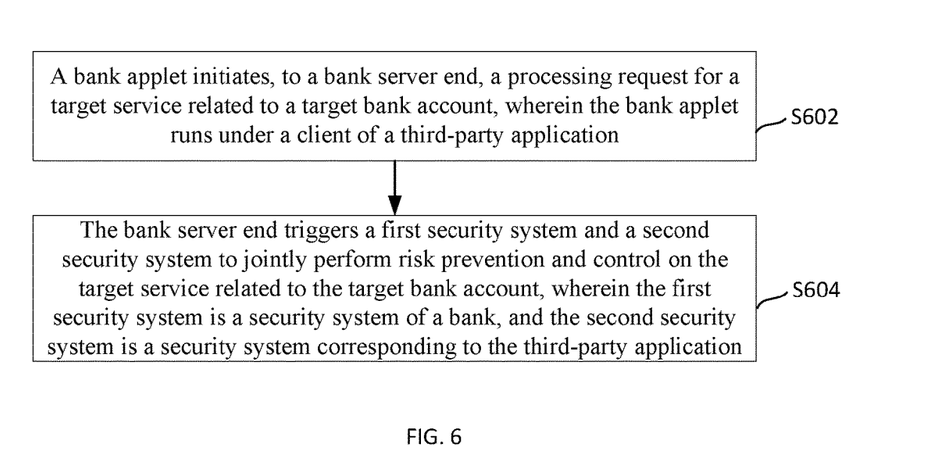
FIG. 6 shows a schematic flow chart of a bank applet-based bank account security protection method according to an embodiment of this description.

On the basis of the technical concept of the aforementioned applet-based account security protection method shown in FIG. 2, this description further provides a bank applet-based bank account security protection method as shown in FIG. 6. The method may include the following steps S602 and S604.

In step 602, a bank applet may initiate a processing request for a target service concerning a target bank account to a bank server end. The bank applet may run on a client of a third-party application.

In step 604, the bank server end may trigger a first security system and a second security system to jointly perform risk prevention and control on the target service related to the target bank account. The first security system may be a security system of a bank, and the second security system may be a security system corresponding to the third-party application.

The first security system may include a first risk control system and a first identity verification system, and the second security system may include a second risk control system and a second identity verification system.

This description further provides a bank applet-based bank account security protection method, which will be described below in detail with reference to a schematic sequence diagram shown in FIG. 7.

Figure 7:
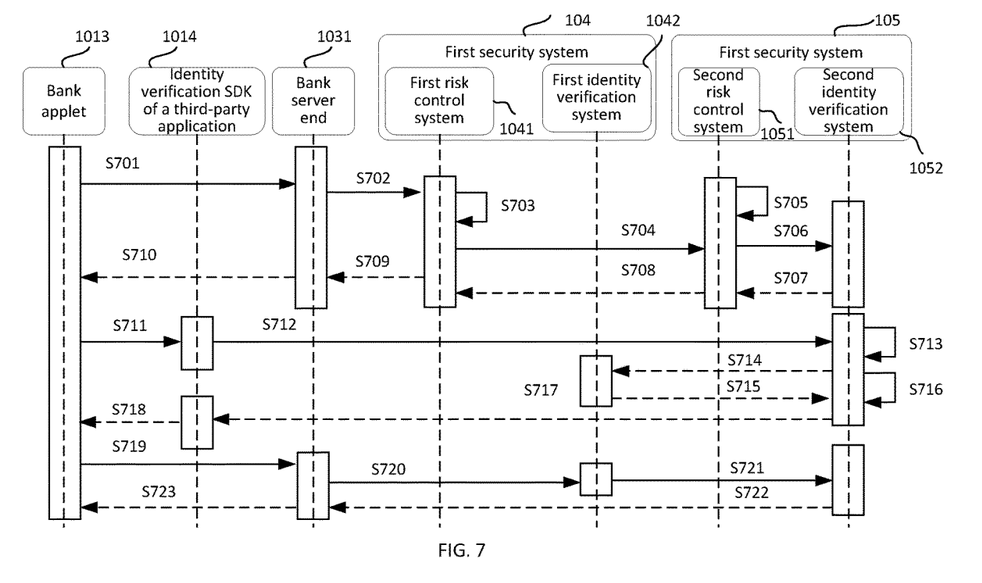
FIG. 7 shows a schematic sequence diagram illustrating interactions in a bank applet-based bank account security protection method according to an embodiment of this description.

As shown in FIG. 7, the bank applet-based bank account security protection method provided in the embodiments of this description may include the following implementation steps.

In step 701, a bank applet 1013 may initiate a processing request for a target service concerning a target bank account to a bank server end 1031. The bank applet 1013 may run under a client of a third-party application.

In step 702, the bank server end 1031 may send a first risk identification request to a first risk control system 1041. The first risk identification request may include essential element information related to the target service.

In step 703, the first risk control system 1041 may perform risk identification on the target service based on the essential element information and obtain a first risk identification result.

In step 704, the first risk control system 1041 may send a second risk identification request to a second risk control system 1051. The second risk identification request may include the essential element information and the first risk identification result.

In step 705, the second risk control system 1051 may perform risk identification on the target service based on the essential element information, obtain a second risk identification result, and combine the first risk identification result and the second risk identification result, to obtain a result of the joint risk identification.

In step 706, when the result of the joint risk identification is a first preset result, the second risk control system 1051 may send an identity verification request to a second identity verification system 1052.

In step 707, the second identity verification system 1052 may return to the second risk control system 1051 an identity verification ID (verify ID).

In step 708, the second risk control system 1051 may forward the identity verification ID to the first risk control system 1041.

In step 709, the first risk control system 1041 may forward the identity verification ID to the bank server end 1031.

In step 710, the bank server end 1031 may forward the identity verification ID to the bank applet 1013.

In step 711, the bank applet 1013 may invoke an identity verification SDK 1014 of the third-party application.

In step 712, the identity verification SDK 1014 of the third-party application may send the identity verification request to the second identity verification system 1052.

In step 713, the second identity verification system 1052 may determine an identity verification type based on the identity verification request.

The identity verification type may include, without being limited to, at least one of password check, face recognition, and SMS check.

In step 714, when the identity verification type includes password check, the second identity verification system 1052 may initiate a password check request to the first identity verification system 1042.

In step 715, the first identity verification system 1042 may check a password entered by a user, obtain a first identity verification result, and feed back the first identity verification result to the second identity verification system 1052.

For example, the password entered by the user may be received by using a rendered password input box of the client of the third-party application, the password may be encrypted by using a public key provided by a bank, to obtain an encrypted password, the encrypted password may be sent to the first identity verification system 1042, and the first identity verification system 1042 may decrypt the encrypted password by using a private key corresponding to the public key to obtain a decrypted password. Whether the decrypted password is consistent with a preset original password may be determined, and the first identity verification result may thus be obtained. It should be appreciated that this method provides the bank the possibility to perform password check by using an account and password system thereof.

In step 716, when the identity verification type further includes face recognition, the second identity verification system 1052 may call its face recognition server end to perform face recognition on the user, and obtain a second identity verification result.

In step 717, the first identity verification result and the second identity verification result may be combined as a joint identity verification result, and the joint identity verification result may be fed back to the identity verification SDK 1014 of the third-party application.

In step 718, the identity verification SDK 1014 of the third-party application may feed back the joint identity verification result to the bank applet 1013.

In step 719, the bank applet 1013 may initiate a check request concerning the joint identity verification result to the bank server end 1031.

In step 720, the bank server end 1031 may initiate a secondary password check request to the first identity verification system 1042.

In step 721, after obtaining a result of the secondary password check, the first identity verification system 1042 may initiate a secondary face recognition request to the second identity verification system 1052.

In step 722, after obtaining a result of the secondary face recognition, the second identity verification system 1052 may feed back the result of the secondary password check and the result of the secondary face recognition to the bank server end 1031.

In step 723, the bank server end 1031 may feed back the result of the secondary password check and the result of the secondary face recognition to the bank applet 1013. When the result of the secondary password check is consistent with the first identity verification result, and the result of the secondary face recognition is consistent with the second identity verification result, the bank applet 1013 may determine, according to the joint identity verification result of the first identity verification result and the second identity verification result, whether to proceed with the target service, to protect the security of the target account.

For example, when both the first identity verification result and the second identity verification result are that the verification succeeds, the applet may determine to proceed with the target service. When at least one of the first identity verification result and the second identity verification result is that the verification fails, the applet may determine to stop proceeding with the target service, thereby protecting the security of the target account.

It should be appreciated that the first identity verification system and the second identity verification system may be combined to perform identity verification again on the user initiating the target service to check whether the joint identity verification result received by the applet has ever been tampered with. This ensures authenticity of the joint identity verification result, thereby more reliably protecting the security of the target account.

According to the bank applet-based bank account security protection method provided in the embodiments of this description, rather than merely using the security system of the third-party application in performing risk prevention and control on the target service related to the target bank account and initiated by the applet, a security system of the bank (the first security system) and a security system of the third-party application under which the bank applet runs (the second security system) are used to jointly perform risk prevention and control on the target service related to the target bank account and initiated by the applet. Therefore, the security of the target bank account can be more reliably protected, and the bank is also provided the possibility to perform autonomous risk control.

Moreover, when the bank applet runs under the third-party application, not only the services of the bank can be expanded by using the third-party application, powerful product capabilities of the third-party application can also be resorted to by the bank to complete KYC. In addition, the method provided in the embodiments of this description may further expand the applicable scope of big data risk control capabilities and identity verification capabilities of the third-party application.

In accordance with the aforementioned method embodiments, this description further provides an applet-based account security protection system and a bank applet-based bank account security protection system, which are separately described below.

Figure 8:
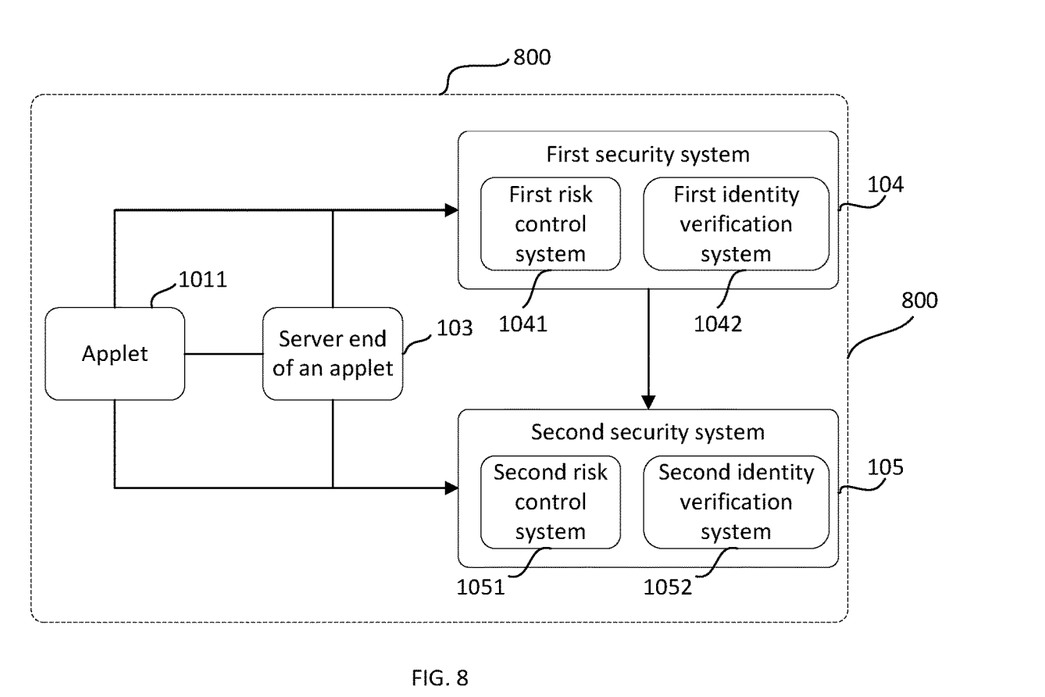
FIG. 8 shows a structural schematic diagram of an applet-based account security protection system according to an embodiment of this description.

As shown in FIG. 8, an applet-based account security protection system 800 provided in the embodiments of this description may include: an applet 1011, a server end 103 of the applet, a first security system 104, and a second security system 105. The first security system 104 may include at least one of a first risk control system 1041 and a first identity verification system 1042, and the second security system 105 may include at least one of a second risk control system 1051 and a second identity verification system 1052.

The applet 1011 may be configured to initiate a processing request for a target service concerning a target account to the server end 103 of the applet. The target account may be opened by a user at a service provider corresponding to the applet, and the applet may run under a client of a third-party application.

The server end 103 may be configured to trigger the first security system 104 and the second security system 105 to jointly perform risk prevention and control on a target service related to the target account. The first security system 104 may be a security system of the service provider, and the second security system 105 may be a security system corresponding to the third-party application.

Several examples are used below to describe in detail a process of using the first security system and the second security system to jointly perform risk prevention and control on the target service related to the target account.

First Example

The first security system 104 may include the first risk control system 1041 and the first identity verification system 1042, and the second security system 105 may include the second risk control system 1051 and the second identity verification system 1052.

The server end 103 may be configured to trigger the first risk control system 1041 and the second risk control system 1051 to jointly perform risk identification on the target service to obtain a result of the joint risk identification.

For example, the server end 103 may be configured to send a first risk identification request to the first risk control system, the first risk identification request may include essential element information related to the target service. The first risk control system 1041 may be configured to perform risk identification on the target service based on the essential element information, obtain a first risk identification result, and send a second risk identification request to the second risk control system. The second risk identification request may include the essential element information and the first risk identification result.

The second risk control system 1051 may be configured to perform risk identification on the target service based on the essential element information, obtain a second risk identification result, and combine the first risk identification result and the second risk identification result to obtain the result of the joint risk identification. When the result of the joint risk identification is a first preset result, the second risk control system 1051 may trigger the first identity verification system 1042 and the second identity verification system 1052 to jointly perform identity verification on the user initiating the target service, obtain a joint identity verification result, and feed back the joint identity verification result to the applet 1011.

For example, the second risk control system 1051 may be configured to send to the second identity verification system an identity verification request. The second identity verification system 1052 may be configured to determine an identity verification type based on the identity verification request. The first identity verification system 1042 may be configured to perform identity verification on the user when the identity verification type includes a first preset type, obtain a first identity verification result, and feed back the first identity verification result to the second identity verification system. Further, the second identity verification system 1052 may be configured to perform identity verification on the user when the identity verification type further includes a second preset type, obtain a second identity verification result, combine the first identity verification result and the second identity verification result as the joint identity verification result, and feed back the joint identity verification result to the applet 1011.

The applet 1011 may be configured to determine, according to the joint identity verification result, whether to proceed with the target service, to protect the security of the target account.

For example, the applet 1011 may be configured to: when both the first identity verification result and the second identity verification result are that the verification succeeds, determine to proceed with (or allow) the target service, and, when at least one of the first identity verification result and the second identity verification result is that the verification fails, determine to stop proceeding with the target service, thereby protecting the security of the target account.

In the aforementioned first example, not only the first risk control system and the second risk control system are used to perform joint prevention and control on risk identification of the target service related to the target account, the first identity verification system and the second identity verification system are further used to perform joint prevention and control on identity verification of the user initiating the target service. Therefore, the security of the target account can be reliably protected.

Second Example

The first security system 104 may include the first risk control system 1041 and the first identity verification system 1042, and the second security system 105 may include the second risk control system 1051 and the second identity verification system 1052.

The server end 103 may be configured to trigger the first risk control system 1041 and the second risk control system 1051 to jointly perform risk identification on the target service and obtain a result of the joint risk identification.

For example, the server end 103 may be configured to send a first risk identification request to the first risk control system 1041. The first risk identification request may include essential element information related to the target service.

The first risk control system 1041 may be configured to perform risk identification on the target service based on the essential element information, obtain a first risk identification result, and send a second risk identification request to the second risk control system. The second risk identification request may include the essential element information and the first risk identification result.

The second risk control system 1051 may be configured to perform risk identification on the target service based on the essential element information, obtain a second risk identification result, and combine the first risk identification result and the second risk identification result to obtain the result of the joint risk identification. When the result of the joint risk identification is a second preset result, the second risk control system 1051 may feed back the result of the joint risk identification to the applet 1011.

The applet 1011 may be configured to determine, according to the result of the joint risk identification, whether to proceed with the target service, to protect the security of the target account.

In the aforementioned second example, rather than merely using the second risk control system in identifying risks concerning the target service, the first risk control system and the second risk control system perform joint prevention and control on risk identification of the target service related to the target account. Therefore, the security of the target account can be more reliably protected.

Third Example

The first security system 104 may include the first identity verification system 1042, and the second security system 105 may include the second identity verification system 1052.

The server end 103 may be configured to trigger the first identity verification system 1042 and the second identity verification system 1052 to jointly perform identity verification on the user initiating the target service, obtain a joint identity verification result, and feed back the joint identity verification result to the applet 1011.

For example, the second identity verification system 1052 may be configured to determine an identity verification type based on an identity verification request. The first identity verification system 1042 may be configured to: when the identity verification type includes a first preset type, perform identity verification on the user, obtain a first identity verification result, and feed back the first identity verification result to the second identity verification system 1052. Further, the second identity verification system 1052 may be configured to: when the identity verification type further includes a second preset type, perform identity verification on the user, obtain a second identity verification result, combine the first identity verification result and the second identity verification result as the joint identity verification result, and feed back the joint identity verification result to the applet 1011.

The applet 1011 may be configured to determine, according to the joint identity verification result, whether to proceed with the target service, to protect the security of the target account.

In the aforementioned third example, the first identity verification system 1042 and the second identity verification system 1052 are used to perform joint prevention and control on identity verification of the user initiating the target service. Therefore, the security of the target account can be reliably protected.

In the aforementioned first example or third example, the applet 1011 may be further configured to initiate a check request concerning the joint identity verification result to the server end. The first identity verification system 1042 and the second identity verification system 1052 may be further configured to jointly perform identity verification again on the user initiating the target service, obtain a result of the secondary identity verification, and feed back the result of the secondary identity verification to the applet 1011. Based on this, the applet 1011 may be further configured to: when it is determined that the joint identity verification result is consistent with the result of the secondary identity verification, determine, according to the joint identity verification result, whether to proceed with the target service, to protect the security of the target account.

It should be appreciated that the first identity verification system 1042 and the second identity verification system 1052 are combined to perform identity verification again on the user initiating the target service to check whether the joint identity verification result received by the applet has ever been tampered with. This ensures authenticity of the joint identity verification result, thereby more reliably protecting the security of the target account.

According to the applet-based account security protection system provided in the embodiments of this description, rather than merely using the security system of the third-party application in performing risk prevention and control on the target service related to the target account and initiated by the applet, the security system of the service provider corresponding to the applet (the first security system) and the security system of the third-party application under which the applet runs (the second security system) are used to jointly perform risk prevention and control on the target service related to the target account and initiated by the applet. Therefore, the security of the target account can be more reliably protected.

Figure 9:
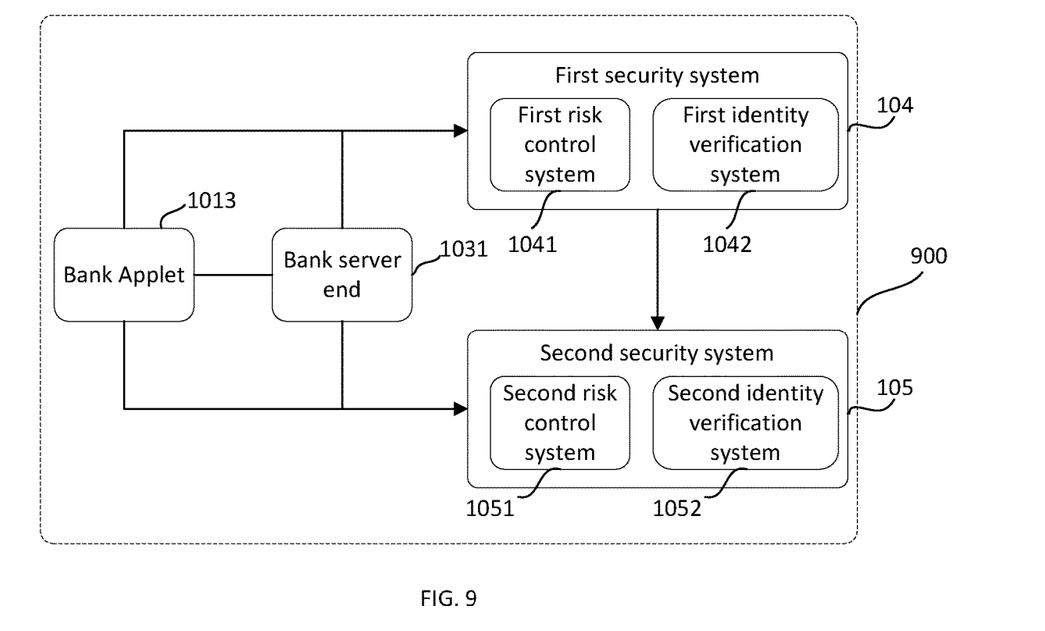
FIG. 9 shows a structural schematic diagram of a bank applet-based bank account security protection system according to an embodiment of this description.

As shown in FIG. 9, an applet-based account security protection system 900 provided in the embodiments of this description may include: a bank applet 1013, a bank server end 1031, a first security system 104, and a second security system 105. The first security system 104 may include at least one of a first risk control system 1041 and a first identity verification system 1042, and the second security system 105 may include at least one of a second risk control system 1051 and a second identity verification system 1052.

The bank applet 1013 may be configured to initiate a processing request for a target service concerning a target bank account to the bank server end. The bank applet may run under a client of a third-party application.

The bank server end 1031 may be configured to trigger the first security system 104 and the second security system 105 to jointly perform risk prevention and control on a target service related to the target bank account. The first security system 104 may be a security system of a bank, and the second security system 105 may be a security system corresponding to the third-party application.

The system embodiments shown in FIG. 9 correspond to the method embodiments shown in FIG. 6. For related portions, please refer to the descriptions of the method embodiments shown in FIG. 6. Details are not repeated herein.

The embodiments of this description are described above. Other embodiments are within the scope of the attached claims. In some cases, actions or steps in the claims may be performed in a sequence different from that in the embodiments and the desired result can still be achieved. In addition, the desired result can still be achieved if the processes described in the drawings are not necessarily performed in the illustrated particular or continuous sequence. In some implementation manners, multitasking and parallel processing are also feasible or may be advantageous.

The embodiments in this description are described in a progressive manner. For same or similar portions in the embodiments, reference may be made to these embodiments, and each embodiment focuses on the difference it has from other embodiments. In particular, for the apparatus embodiments, since they are basically similar to the method embodiments, description thereof is made rather concisely and the associated parts may be referred to the corresponding description in the method embodiments.

The aforementioned embodiments are only preferred embodiments of this description and are not intended to limit the protection scope of this description. Any modification, equivalent replacement, or improvement made within the spirit and principle of one or more embodiments of this description shall fall within the protection scope of the one or more embodiments of this description.

Systems, apparatuses, modules or units described in the aforementioned embodiments may be implemented by computer chips or entities, or products with certain functions. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of the devices.

The computer-readable media include permanent and non-permanent media and removable and non-removable media, which can achieve information storage by any method or technology. Information may be computer-readable instructions, data structures, program modules or other data. Examples of storage media of the computer include, but are not limited to, a phase change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical memories, a cassette tape, and a magnetic tape disk storage, other magnetic storage devices or any other non-transmitting media, which can be used to store information that can be accessed by the computing device. As defined herein, the computer-readable media do not include transitory computer-readable media (transitory media), such as modulated data signals and carriers.

It should also be noted that the terms "including", "comprising" or any other variants thereof are intended to cover non-exclusive inclusion, such that a process, method, a product, or device including a series of elements includes not only those elements but also other elements not explicitly listed, or further includes inherent elements of such process, method, product or device. Unless more limitations are stated, an element defined by a statement "comprising a" does not exclude that other same elements further exist in a process, method, article, or device comprising this element.

Each embodiment in this description is described in a progressive manner, and same or similar portions among the embodiments may be referenced to one another. Each embodiment focuses on differences it has from other embodiments. In particular, as being basically similar to the embodiment of the method, the embodiment of a system is described in a concise manner. For relevant portions, reference may be made to part of the descriptions in the method embodiments.

The invention claimed is:

1. An applet-based account security protection method, comprising:
   receiving, from an applet, a processing request for a target service related to a target account, wherein the target account is opened by a user at a service provider corresponding to the applet, and the applet runs on a client of a third-party application; and
   triggering a first security system and a second security system to jointly perform risk prevention and control on the target service related to the target account, wherein the first security system is a security system of the service provider, and the second security system is a security system corresponding to the third-party application,
   wherein the first security system comprises a first identity verification system, and the second security system comprises a second identity verification system, wherein the first identity verification system is configured to perform an identity verification of a first preset type on the user, the second identity verification system is configured to perform an identity verification of a second preset type on the user, wherein the second preset type is different from the first preset type and independent of the first preset type, and
   wherein the triggering a first security system and a second security system to jointly perform risk prevention and control on the target service related to the target account further comprises:
   triggering the first identity verification system and the second identity verification system to jointly perform identity verification on the user initiating the target service to obtain a joint identity verification result; and
   feeding back the joint identity verification result to the applet for the applet to determine, according to the joint identity verification result, whether to proceed with the target service.

2. The method of claim 1, wherein the first security system further comprises a first risk control system, and the second security system further comprises a second risk control system, and
   wherein the triggering a first security system and a second security system to jointly perform risk prevention and control on the target service related to the target account further comprises:
   triggering the first risk control system and the second risk control system to jointly perform risk identification on the target service, to obtain a result of a joint risk identification, and
   wherein the triggering the first identity verification system and the second identity verification system to jointly perform identity verification on the user initiating the target service to obtain a joint identity verification result comprises:
   in response to the result of the joint risk identification being a first preset result, triggering, by the second risk control system, the first identity verification system and the second identity verification system to jointly perform identity verification on the user initiating the target service to obtain a joint identity verification result.

3. The method of claim 2, wherein the triggering the first risk control system and the second risk control system to jointly perform risk identification on the target service, to obtain a result of a joint risk identification comprises:
   sending to the first risk control system a first risk identification request, wherein the first risk identification request includes information related to the target service;
   performing, by the first risk control system and based on the information, risk identification on the target service to obtain a first risk identification result, and sending a second risk identification request to the second risk control system, wherein the second risk identification request includes the information and the first risk identification result; and
   performing, by the second risk control system and based on the information, risk identification on the target service to obtain a second risk identification result, and combining the first risk identification result and the second risk identification result to obtain the result of the joint risk identification.

4. The method of claim 2, wherein the triggering, by the second risk control system, the first identity verification system and the second identity verification system to jointly perform identity verification on the user initiating the target service to obtain a joint identity verification result comprises:
   sending, by the second risk control system, to the second identity verification system an identity verification request;
   performing, by the first identity verification system, identity verification on the user to obtain a first identity verification result, and feeding back the first identity verification result to the second identity verification system; and
   performing, by the second identity verification system, identity verification on the user to obtain a second identity verification result, combining the first identity verification result and the second identity verification result as the joint identity verification result.

5. The method of claim 4, wherein the first preset type is password check, and, the performing, by the first identity verification system, identity verification on the user to obtain a first identity verification result comprises:
   receiving, by the client of the third-party application, a password entered by the user, encrypting the password to obtain an encrypted password, and sending the encrypted password to the first identity verification system; and
   determining, by the first identity verification system, whether the encrypted password matches a preset original password to obtain the first identity verification result.

6. The method of claim 2, further comprising:
   in response to the result of the joint risk identification being a second preset result, feeding back, by the second risk control system, the result of the joint risk identification to the applet for the applet to determine, according to the result of the joint risk identification, whether to proceed with the target service.

7. The method of claim 4, wherein the feeding back the joint identity verification result to the applet for the applet to determine, according to the joint identity verification result, whether to proceed with the target service comprises:
   feeding back the joint identity verification result to the applet;
   receiving, from the applet, a check request regarding the joint identity verification result; and triggering the first identity verification system and the second identity verification system to perform identity verification again on the user initiating the target service to obtain a result of a secondary identity verification, and feeding back the result of the secondary identity verification to the applet.

8. An applet-based account security protection system, the system comprising an applet server comprising a processor and a memory coupled with each other, a first security system deployed in one or more first servers, and a second security system deployed in one or more second servers, the system is configured to perform operations, comprising:

receiving, by the applet server, from an applet, a processing request for a target service related to a target account, wherein the target account is opened by a user at a service provider corresponding to the applet, and the applet runs on a client of a third-party application; and triggering, by the applet server, the first security system and the second security system to jointly perform risk prevention and control on the target service related to the target account, wherein the first security system is a security system of the service provider, and the second security system is a security system corresponding to the third-party application, wherein the first security system comprises a first identity verification system, and the second security system comprises a second identity verification system, wherein the first identity verification system is configured to perform an identity verification of a first preset type on the user, the second identity verification system is configured to perform an identity verification of a second preset type on the user, wherein the second preset type is different from the first preset type and independent of the first preset type, and wherein the triggering, by the applet server, the first security system and the second security system to jointly perform risk prevention and control on the target service related to the target account further comprises:

triggering the first identity verification system and the second identity verification system to jointly perform identity verification on the user initiating the target service to obtain a joint identity verification result; and feeding back the joint identity verification result to the applet for the applet to determine, according to the joint identity verification result, whether to proceed with the target service.

9. The system of claim 8, wherein the first security system further comprises a first risk control system, and the second security system further comprises a second risk control system, wherein the triggering, by the server end, the first security system and the second security system to jointly perform risk prevention and control on the target service related to the target account further comprises:

triggering the first risk control system and the second risk control system to jointly perform risk identification on the target service to obtain a result of a joint risk identification, and wherein the triggering the first identity verification system and the second identity verification system to jointly perform identity verification on the user initiating the target service to obtain a joint identity verification result comprises:

in response to the result of the joint risk identification being a first preset result, triggering, by the second risk control system, the first identity verification system and the second identity verification system to jointly perform identity verification on the user initiating the target service to obtain a joint identity verification result.

10. The system of claim 9, wherein the triggering the first risk control system and the second risk control system to jointly perform risk identification on the target service, to obtain a result of the joint risk identification comprises:

sending, by the server end, to the first risk control system a first risk identification request, wherein the first risk identification request includes information related to the target service;

performing, by the first risk control system and based on the information related to the target service, risk identification on the target service to obtain a first risk identification result, and sending a second risk identification request to the second risk control system, wherein the second risk identification request includes the information related to the target service and the first risk identification result; and performing, by the second risk control system and based on the information related to the target service, risk identification on the target service to obtain a second risk identification result, and combining the first risk identification result and the second risk identification result to obtain the result of the joint risk identification.

11. The system of claim 9, wherein the triggering, by the second risk control system, the first identity verification system and the second identity verification system to jointly perform identity verification on the user initiating the target service to obtain a joint identity verification result comprises:

sending, by the second risk control system, to the second identity verification system an identity verification request;

performing, by the first identity verification system, identity verification on the user to obtain a first identity verification result, and feeding back the first identity verification result to the second identity verification system; and performing, by the second identity verification system, identity verification on the user to obtain a second identity verification result, combining the first identity verification result and the second identity verification result as the joint identity verification result.

12. The system of claim 11, wherein in the first preset type is password check, and, the performing, by the first identity verification system, identity verification on the user to obtain a first identity verification result comprises:

receiving, by the client of the third-party application, a password entered by the user, encrypting the password to obtain an encrypted password, and sending the encrypted password to the first identity verification system; and determining, by the first identity verification system, whether the encrypted password matches a preset original password to obtain the first identity verification result.

13. The system of claim 9, wherein the operations further comprise:

in response to the result of the joint risk identification being a second preset result, feeding back, by the second risk control system, the result of the joint risk identification to the applet; and determining, by the applet and according to the result of the joint risk identification, whether to proceed with the target service.

14. The system of claim 11, wherein the feeding back the joint identity verification result to the applet for the applet to determine, according to the joint identity verification result, whether to proceed with the target service comprises:
- feeding back the joint identity verification result to the applet;
- receiving, by the server end, from the applet, a check request regarding the joint identity verification result; and
- triggering, by the server end, the first identity verification system and the second identity verification system to perform identity verification again on the user initiating the target service to obtain a result of a secondary identity verification, and feeding back the result of the secondary identity verification to the applet.

15. An applet-based account security protection method, comprising:
- initiating, by an applet, to a server end of the applet a processing request for a target service related to a target account, wherein the target account is opened by a user at a service provider corresponding to the applet, and the applet runs on a client of a third-party application; and
- triggering, by the server end, a first security system and a second security system to jointly perform risk prevention and control on the target service related to the target account, wherein the first security system is a security system of the service provider, and the second security system is a security system corresponding to the third-party application,
- the first security system comprises a first risk control system and a first identity verification system, and the second security system comprises a second risk control system and a second identity verification system, wherein the first identity verification system is configured to perform an identity verification of a first preset type on the user, the second identity verification system is configured to perform an identity verification of a second preset type on the user, wherein the second preset type is different from the first preset type and independent of the first preset type.

16. The method according to claim 15,
wherein the triggering, by the server end, a first security system and a second security system to jointly perform risk prevention and control on the target service related to the target account comprises:
- triggering, by the server end, the first risk control system and the second risk control system to jointly perform risk identification on the target service, and obtaining a result of the joint risk identification;
- when the result of the joint risk identification is a first preset result, triggering, by the second risk control system, the first identity verification system and the second identity verification system to jointly perform identity verification on the user initiating the target service, obtaining a joint identity verification result, and feeding back the joint identity verification result to the applet; and
- determining, by the applet according to the joint identity verification result, whether to proceed with the target service, so as to safeguard security of the target account.

17. The method according to claim 16, wherein
the triggering, by the server end, the first risk control system and the second risk control system to jointly perform risk identification on the target service, and obtaining a result of the joint risk identification comprises:
- sending, by the server end, to the first risk control system a first risk identification request, wherein the first risk identification request carries information related to the target service;
- performing, by the first risk control system, risk identification on the target service based on the information related to the target service and obtaining a first risk identification result, and sending a second risk identification request to the second risk control system, wherein the second risk identification request carries the information related to the target service and the first risk identification result; and
- performing, by the second risk control system, risk identification on the target service based on the information related to the target service, obtaining a second risk identification result, and combining the first risk identification result and the second risk identification result to obtain the result of the joint risk identification.

18. The method according to claim 16, wherein
the triggering, by the second risk control system, the first identity verification system and the second identity verification system to jointly perform identity verification on the user initiating the target service, obtaining a joint identity verification result, and feeding back the joint identity verification result to the applet comprises:
- sending, by the second risk control system, to the second identity verification system an identity verification request;
- performing, by the first identity verification system, identity verification on the user to obtain a first identity verification result, and feeding back the first identity verification result to the second identity verification system; and
- performing, by the second identity verification system, identity verification on the user to obtain a second identity verification result, combining the first identity verification result and the second identity verification result as the joint identity verification result, and feeding back the joint identity verification result to the applet.

19. The method according to claim 18, wherein
the first preset type is password check, and the performing, by the first identity verification system, identity verification on the user to obtain a first identity verification result comprises:
- receiving, by the client of the third-party application, a password entered by the user, encrypting the password to obtain an encrypted password, and sending the encrypted password to the first identity verification system; and
- determining, by the first identity verification system, whether the encrypted password matches a preset original password to obtain the first identity verification result.

20. The method according to claim 15, wherein
the first security system comprises a first identity verification system, the second security system comprises a second identity verification system, and the triggering, by the server end, a first security system and a second security system to jointly perform risk prevention and control on the target service related to the target account comprises:
- triggering, by the server end, the first identity verification system and the second identity verification system to jointly perform identity verification on the user initiating the target service, obtaining a joint identity verification result, and feeding back the joint identity verification result to the applet; and determining, by the applet according to the joint identity verification result, whether to proceed with the target service.

* * * * *